(12) United States Patent
Lang et al.

(10) Patent No.: US 9,512,618 B2
(45) Date of Patent: Dec. 6, 2016

(54) RIGIDLY FOLDABLE ARRAY OF THREE-DIMENSIONAL BODIES

(71) Applicant: BRIGHAM YOUNG UNIVERSITY, Provo, UT (US)

(72) Inventors: Robert J. Lang, Provo, UT (US); Bryce J. Edmondson, Provo, UT (US); Spencer P. Magleby, Provo, UT (US); Larry L. Howell, Orem, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 0 days.

(21) Appl. No.: 14/548,148

(22) Filed: Nov. 19, 2014

(65) Prior Publication Data

US 2015/0140253 A1 May 21, 2015

Related U.S. Application Data

(60) Provisional application No. 61/906,807, filed on Nov. 20, 2013.

(51) Int. Cl.
*E04C 2/40* (2006.01)
*F24J 2/36* (2006.01)
*F24J 2/52* (2006.01)
*F24J 2/54* (2006.01)

(52) U.S. Cl.
CPC .............. *E04C 2/405* (2013.01); *F24J 2/36* (2013.01); *F24J 2002/5277* (2013.01); *F24J 2002/5468* (2013.01); *Y02E 10/40* (2013.01); *Y10T 428/19* (2015.01)

(58) Field of Classification Search
CPC ............. F24J 2/36; F24J 2002/5277; F24J 2002/5468; E04C 2/405; Y10T 428/19; Y02E 10/40

USPC .......................................... 52/64, 9, 70, 716
See application file for complete search history.

(56) References Cited

U.S. PATENT DOCUMENTS

| | | | | | |
|---|---|---|---|---|---|
| 1,110,084 | A | * | 9/1914 | Szalkay | F41H 5/08 109/49.5 |
| 2,912,687 | A | * | 11/1959 | Leonard | H01Q 15/20 160/220 |
| 3,690,080 | A | * | 9/1972 | Dillard | B64G 1/222 136/245 |
| 3,848,821 | A | * | 11/1974 | Scheel | B64G 1/222 135/115 |
| 3,992,162 | A | * | 11/1976 | Gewiss | B01J 19/32 428/179 |
| 4,713,492 | A | * | 12/1987 | Hanak | H02S 30/20 126/624 |
| 4,981,732 | A | * | 1/1991 | Hoberman | A63H 33/16 428/12 |
| 5,008,140 | A | * | 4/1991 | Schmertz | E04C 2/326 428/179 |

(Continued)

FOREIGN PATENT DOCUMENTS

DE 202012100918 5/2012
FR 2525393 10/1983

(Continued)

OTHER PUBLICATIONS

U.S. Appl. No. 61/960,333, filed Sep. 16, 2013, Francis et al.

(Continued)

*Primary Examiner* — James Ference
(74) *Attorney, Agent, or Firm* — Dorsey & Whitney LLP

(57) ABSTRACT

Rigidly foldable, foldable multi-body arrays or systems that may include three-dimensional bodies connected together by multiple hinges and reconfigurable between unfolded and folded configurations.

27 Claims, 7 Drawing Sheets

(56) References Cited

U.S. PATENT DOCUMENTS

| | | | |
|---|---|---|---|
| 5,234,727 A | 8/1993 | Hoberman | |
| 5,296,044 A | 3/1994 | Harvey et al. | |
| 5,379,596 A * | 1/1995 | Grayson | F25B 27/002 |
| | | | 136/245 |
| 5,520,747 A * | 5/1996 | Marks | B64G 1/222 |
| | | | 136/245 |
| 5,598,883 A | 2/1997 | Platsis | |
| 5,785,280 A * | 7/1998 | Baghdasarian | B64G 1/222 |
| | | | 136/245 |
| 5,901,428 A | 5/1999 | Sheridan | |
| 5,947,885 A | 9/1999 | Paterson | |
| 5,969,501 A * | 10/1999 | Glidden | F24J 2/523 |
| | | | 320/101 |
| 6,010,096 A * | 1/2000 | Baghdasarian | B64G 1/222 |
| | | | 160/135 |
| 6,082,056 A | 7/2000 | Hoberman | |
| 6,135,193 A | 10/2000 | Lloyd | |
| 6,147,294 A * | 11/2000 | Dailey | B64G 1/222 |
| | | | 136/245 |
| 6,284,967 B1 | 9/2001 | Hakan | B64G 1/222 |
| | | | 136/245 |
| 6,343,442 B1 * | 2/2002 | Marks | B64G 1/222 |
| | | | 244/172.6 |
| 6,476,311 B1 | 11/2002 | Lee et al. | |
| 6,609,683 B2 * | 8/2003 | Bauer | B64G 1/443 |
| | | | 244/168 |
| 6,935,997 B2 | 8/2005 | Kling | |
| 6,991,232 B1 | 1/2006 | Yufa et al. | |
| 7,658,071 B1 * | 2/2010 | McDermott | F24J 2/085 |
| | | | 126/624 |
| 7,665,397 B1 * | 2/2010 | Monk | F41H 5/0457 |
| | | | 109/80 |
| 7,690,158 B2 * | 4/2010 | Kelly | E04B 2/7429 |
| | | | 181/291 |
| 7,718,923 B1 * | 5/2010 | Hansen | B60L 1/02 |
| | | | 160/370.21 |
| 7,794,019 B2 | 9/2010 | Hoberman | |
| 7,806,370 B2 * | 10/2010 | Beidleman | B64G 1/222 |
| | | | 136/245 |
| 7,898,212 B2 * | 3/2011 | Benn | F24J 2/36 |
| | | | 126/573 |
| 8,066,227 B2 * | 11/2011 | Keller | B64G 1/222 |
| | | | 244/159.4 |
| 8,109,472 B1 * | 2/2012 | Keller | B64G 1/222 |
| | | | 136/245 |
| 8,261,494 B2 * | 9/2012 | Pierce Jones | E04F 15/02405 |
| | | | 136/244 |
| 8,356,774 B1 | 1/2013 | Banik | |
| 8,376,282 B2 * | 2/2013 | Keller | B64G 1/222 |
| | | | 136/245 |
| 8,387,921 B2 * | 3/2013 | Taylor | B64G 1/222 |
| | | | 136/245 |
| 8,744,610 B2 | 6/2014 | Kling | |
| 2003/0127125 A1 * | 7/2003 | Yeh | H02S 10/40 |
| | | | 136/251 |
| 2006/0176660 A1 * | 8/2006 | Amiri | G06F 1/1615 |
| | | | 361/679.09 |
| 2007/0012348 A1 * | 1/2007 | Hoberman | A47C 4/04 |
| | | | 135/145 |
| 2007/0199563 A1 * | 8/2007 | Fox | F24J 2/16 |
| | | | 126/684 |
| 2008/0314434 A1 * | 12/2008 | Khouri | E04D 5/12 |
| | | | 136/245 |
| 2009/0064601 A1 * | 3/2009 | Kroes | E04C 2/405 |
| | | | 52/108 |
| 2009/0178703 A1 * | 7/2009 | Gumm | H02S 20/23 |
| | | | 136/244 |
| 2009/0202856 A1 | 8/2009 | Hiraoka et al. | |
| 2009/0320898 A1 * | 12/2009 | Gumm | H02S 20/24 |
| | | | 136/245 |
| 2010/0108120 A1 * | 5/2010 | Lin | H02S 30/20 |
| | | | 136/245 |
| 2010/0156339 A1 * | 6/2010 | Hoffman | H02S 30/20 |
| | | | 320/101 |
| 2010/0282295 A1 * | 11/2010 | Gomery | F24J 2/16 |
| | | | 136/246 |
| 2011/0132353 A1 * | 6/2011 | Gumm | F24J 2/5233 |
| | | | 126/680 |
| 2011/0179791 A1 * | 7/2011 | Butler | F24J 2/16 |
| | | | 60/641.15 |
| 2011/0220176 A1 * | 9/2011 | Halpern | F24J 2/36 |
| | | | 136/246 |
| 2011/0253193 A1 * | 10/2011 | Korman | F24J 2/36 |
| | | | 136/245 |
| 2011/0253614 A1 * | 10/2011 | Curran | H02S 20/23 |
| | | | 210/239 |
| 2011/0277748 A1 * | 11/2011 | Chu | H02S 30/20 |
| | | | 126/627 |
| 2012/0090659 A1 * | 4/2012 | Muchow | H01L 31/0504 |
| | | | 136/245 |
| 2012/0216850 A1 * | 8/2012 | Chu | H02S 30/20 |
| | | | 136/245 |
| 2012/0291847 A1 * | 11/2012 | Rowe, Jr. | H02S 20/00 |
| | | | 136/245 |
| 2012/0313569 A1 * | 12/2012 | Curran | F24J 2/523 |
| | | | 320/101 |
| 2013/0186450 A1 * | 7/2013 | Smith | H02J 7/0052 |
| | | | 136/245 |
| 2013/0234645 A1 * | 9/2013 | Goei | H02J 7/0052 |
| | | | 320/101 |
| 2013/0247797 A1 * | 9/2013 | Hisata | B64D 11/00 |
| | | | 108/43 |
| 2013/0248467 A1 * | 9/2013 | Wever | F24J 2/5211 |
| | | | 211/41.1 |
| 2013/0285595 A1 * | 10/2013 | Eaton, Jr. | H01L 31/0422 |
| | | | 320/101 |
| 2015/0075583 A1 | 3/2015 | Francis et al. | |

FOREIGN PATENT DOCUMENTS

| | | |
|---|---|---|
| JP | S60147150 | 8/1985 |
| JP | H01109199 | 4/1989 |
| JP | 2001332752 | 11/2001 |
| JP | 2005240304 | 9/2005 |
| JP | 2009051620 | 3/2009 |
| JP | 2014140605 | 8/2014 |
| WO | WO 2012/167291 | 12/2012 |

OTHER PUBLICATIONS

U.S. Appl. No. 14/484,006, filed Sep. 11, 2014, Francis et al.
Arkin, et al., 2004, "When can you fold a map?", Computational Geometry, 29(1), pp. 23-46.
Bowen, et al., 2013, "An approach for understanding action origami as kinematic mechanisms", Journal of Mechanical Design.
Bowen et al., "A Classification of Action Origami as Systems of Spherical Mechanisms", Journal of Mechanical Design, Nov. 2013, vol. 135, pp. 111008-1-111008-7.
Campbell, et al., 2006, "Development of a novel, passively deployed solar array", AIAA Journal, 21(9), pp. 2080 (1-8 as printed).
Edmondson et al. "Draft: An Orthogonal Construction Technique for Thick Rigidly Foldable Origami", The American Society of Mechanical Engineers, 2014, pp. 1-7.
Faist, K.A. et al. "Parametric study on the use of Hoberman mechanisms for reconfigurable antenna and solar arrays.", In Proceedings of IEEE Aerospace Conference, Paper #1172; available at least as of 2010.
Francis et al., "Origami-like creases in sheet materials for compliant mechanism design", Mechanical Sciences, 2013, pp. 371-380.
Gioia, F., et al., 2012, "Design and analysis of a foldable/unfoldable corrugated architectural curved envelop." Journal of Mechanical Design, 134, p. 031003.
Guest, et al., 1992, "Inextensional wrapping of flat membranes", Proceedings of the First International Seminar of Structural Morphology, pp. 203-215, Available at least as of 1992.
International Search Report and Written Opinion from International Application No. PCT/US2014/055250 mailed Feb. 3, 2015.
International Search Report and Written Opinion from International Application No. PCT/US2014/066450 mailed Mar. 26, 2015.

(56) References Cited

OTHER PUBLICATIONS

Iverson, "Dynamic Control of Radiative Absorption and Emission through Tunable, Origami-Based Geometries", Faculty Research Fellowship, Jul. 2014, 2 pages.
Lunnon W.F., 1968, "A map-folding problem", Mathematics of Computation, pp. 193-199.
Lunnon, W.F., 1971, "Multi-dimensional map-folding", The Computer Journal, 14(1), pp. 75-80.
Malone et al., 1996, "Lightweight inflatable solar array", J Propul Power, 12(5), pp. 866-872.
Mavroidis et al. "Analysis of Overcontrained Mechanisms", Journal of Mechanical Design, Mar. 1995, vol. 117, pp. 69-74.
Mavroidis et al. "New and Revised Overcontrained Mechanisms", Journal of Mechanical Design, 1995, vol. 117, pp. 75-82.
Miura, K., 1980, "Method of packaging and deployment of large membranes in space", Proceedings of 31st Cong. Int. Astronaut Feceration, pp. 1-10.
Miura, K. et al., 1985, "2-D array experiment on board of space flyer unit", Space Solar Power Review, 5(4), pp. 345-356.
National Academy of Engineering of the National Academies, 2012, "Grand challenges", http://www.engineeringchallenges.org/.
Park et al., "Dynamic Control of Radiation-Based Thermal Management through Origami-Inspired Design", available at least as of 2013.
Schenk et al. "Geometry of Miura-Folded Meta-Materials—Supplementary Information" Cambridge University Engineering Department, pp. 1-7, available at least as of 2013.
Tachi, "Geometric Considerations for the Design of Rigid Origami Structures", Proceedings of the International Association for Shell and Spatial Structures (LASS) Symposium, 2010, 12 pages.
Tachi, T., 3022, "Rigid-foldable thick origami", In Origami 5: Fifth International Meeting of Origami Science, Mathematics, and Education, P. Wang-Iverson, R. Lang, and M. Yim, eds., vol., CRC Press, pp. 253-264, available at least as of 2011.
Trautz et al. "Deployable folded plate structures—folding patters based on 4-fold-mechanism using stiff plates", Proceedings of the International Association for Shell and Spatial Structures (IASS) Symposium, 2009, pp. 2306-2317.
Zirbel et al., "Accommoating Thickness in Origami-Based Deployable Arrays", Journal of Mechanical Design, Nov. 2013, vol. 135, pp. 111005-1-111005-11.
Zirbel, et al., "An Origami-Inspired Self-Deployable Array", Amercian Society of Mechanical Engineers (ASME), 2013, pp. 1-7.
U.S. Appl. No. 61/906,807, filed Nov. 20, 2013, Lang et al.
Edmondson et al. "An Offset Panel Technique for Thick Rigidly Foldable Origami" Proceeding of the ASME 2014 International Design Engineering Technical Conferences & Computers and Information Engineering Conference IDETC/CIE 2014, Aug. 17-20, 2014, pp. 1-8.
Tachi "Rigid-Foldable Thick Origami" www.tsg.ne.jp/TT/cg/ThickRigidOrigami_tachi_5OSME.pdf [Online] Accessed Sep. 24, 2014.

* cited by examiner

RIGIDLY FOLDABLE ARRAY OF THREE-DIMENSIONAL BODIES

CROSS-REFERENCE TO RELATED APPLICATIONS

This application claims priority to U.S. Provisional Application No. 61/906,807 filed on 20 Nov. 2013, the disclosure of which is incorporated herein, in its entirety, by this reference.

STATEMENT OF GOVERNMENT INTEREST

The United States Government has rights in this invention pursuant to Grant No. 1240417 between the National Science Foundation and Brigham Young University.

BACKGROUND

In some instances, folding or compacting multiple three-dimensional panels and/or functional electrical components from a substantially planar configuration into a folded or a three-dimensional configuration may facilitate storage and/or transportation of such panels and/or of the functional electrical components. For example, functional electrical components may be multiple photovoltaic cells that, in a substantially planar configuration may be deployed to supply electric power to appliances. Reconfiguring a multiple functional electrical components from a substantially planar configuration into a three-dimensional, folded configuration may facilitate transportation and/or storage thereof (e.g., when the functional electrical components are not in operation).

Accordingly, users and manufacturers of devices and systems that include three-dimensional panels and/or functional electrical components continue to seek improvements to portability and storability of such devices and systems.

SUMMARY

Embodiments disclosed herein relate to rigidly foldable, foldable multi-body arrays or systems that may include three-dimensional objects or bodies (e.g., rigid objects) connected together by multiple hinges and reconfigurable between unfolded and folded configurations. In some embodiments, in the unfolded configuration, the rigidly foldable array may include multiple hinges that may generally lie in a single joint or hinge plane (e.g., pivot axes of the hinges may generally lie in the hinge plane). Moreover, generally, the hinges may have any number of suitable orientations relative to one another, which may facilitate folding and unfolding the three-dimensional object between the folder and unfolded configurations.

At least one embodiment involves a foldable multi-body array reconfigurable between folded and unfolded configurations. The foldable multi-body array includes a plurality of hinges. For example, each, some, or at least two hinges of the plurality of hinges may be oriented at a non-parallel angle or substantially parallel relative to one another. The foldable multi-body array further includes a plurality of three-dimensional bodies connected together by the plurality of hinges. Each of the plurality of three-dimensional bodies may be associated with at least one of the hinges and pivotable about the at least one of the hinges between the unfolded and folded configurations of the foldable multi-body array. In the unfolded configuration, each of the plurality of hinges approximately lies in a first plane. In the folded configuration, each of the plurality of hinges approximately lies in a second plane.

One or more embodiments include a foldable multi-body array reconfigurable between folded and unfolded configurations. The foldable multi-body array includes a plurality of three-dimensional bodies each having a first surface. At least a portion of each of the first surfaces is substantially planar. The foldable multi-body array also includes a plurality of protrusions attached to at least some of the three-dimensional bodies. For example, the plurality of protrusions may be separately formed and attached to at least some of the three-dimensional bodies, or the plurality of protrusions may be integrally formed with at least some of the three-dimensional bodies. Each of the plurality of protrusions extends away from at least one of the one or more first surfaces. The foldable multi-body array further includes a plurality of hinges pivotably connecting together the plurality of three-dimensional bodies in a manner that pivoting of the three-dimensional bodies reconfigures the foldable multi-body array between the folded and unfolded configurations. When the foldable multi-body array is in the unfolded configuration, at least some of the hinges generally lie in a first plane that is parallel with the at least one first surface of at least one of the plurality of three-dimensional bodies, and at least one hinge generally lies is offset from at least one of the one or more first surfaces.

Additional or alternative embodiments include a foldable multi-body array reconfigurable between folded and unfolded configurations, which includes a plurality of three-dimensional bodies each including a plurality of surfaces. The foldable multi-body array further includes a plurality of hinges pivotably connecting together the plurality of three-dimensional bodies in a manner that pivoting of the three-dimensional bodies reconfigures the foldable multi-body array between the folded and unfolded configurations. When the foldable multi-body array is in the unfolded configuration, each of the plurality of hinges generally lies in a first plane, at least one of the plurality of surfaces of each of the three-dimensional bodies is offset from the first plane, and the first plane and the plurality of the three-dimensional bodies are non-intersecting with each other.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Embodiments disclosed herein relate to rigidly foldable, foldable multi-body arrays or systems that may include three-dimensional objects or bodies (e.g., rigid or flexible objects) connected together by multiple hinges and reconfigurable between unfolded and folded configurations. In any of the embodiments disclosed herein, the foldable multi-body arrays may include an ordered array arrangement of the three-dimensional objects or bodies or an unordered array arrangement of the three-dimensional objects or bodies. In some embodiments, in the unfolder configuration, the rigidly foldable array may include multiple hinges that may generally lie in a single joint or hinge plane (e.g., pivot axes of the hinges may generally lie in the hinge plane). Moreover, generally, the hinges may have any number of suitable orientations relative to one another, which may facilitate folding and unfolding the three-dimensional object between the folder and unfolded configurations.

In at least one embodiment, after folding (e.g., in the folded configuration) the rigidly foldable system, the hinges may be positioned or may generally lie in the same folded hinge plane. In some embodiments, the folded hinge plane may be different from the unfolded hinge plane of the rigidly foldable system (e.g., the folded and unfolded hinge planes may be offset from each other, non-parallel to each other, etc.). Alternatively, in some embodiments, the folded and unfolded hinge plane may coincident to each other.

In one or more embodiments, the rigidly foldable structure may include one or more extensions or protrusions extending away from one or more three-dimensional bodies. For example, one, some, or all of the hinges may be located at distal ends of the protrusions. In some embodiments, at least some of the hinges may be generally lie in the same plane, which may be offset from one or more surfaces of the three-dimensional bodies.

In some embodiments, the hinges connecting the three-dimensional bodies in foldable multi-body array may be interdependent, such that movement of two three-dimensional bodies about a connecting hinge may produce corresponding movement of other three-dimensional bodies. For example, pivoting two adjacent three-dimensional bodies about the connecting hinge may reconfigure the foldable multi-body array from the unfolded into the folded configuration. Also, pivoting two adjacent three-dimensional bodies about the connecting hinge may reconfigure the foldable multi-body array from the folded into the unfolded configuration.

Figure 1A:
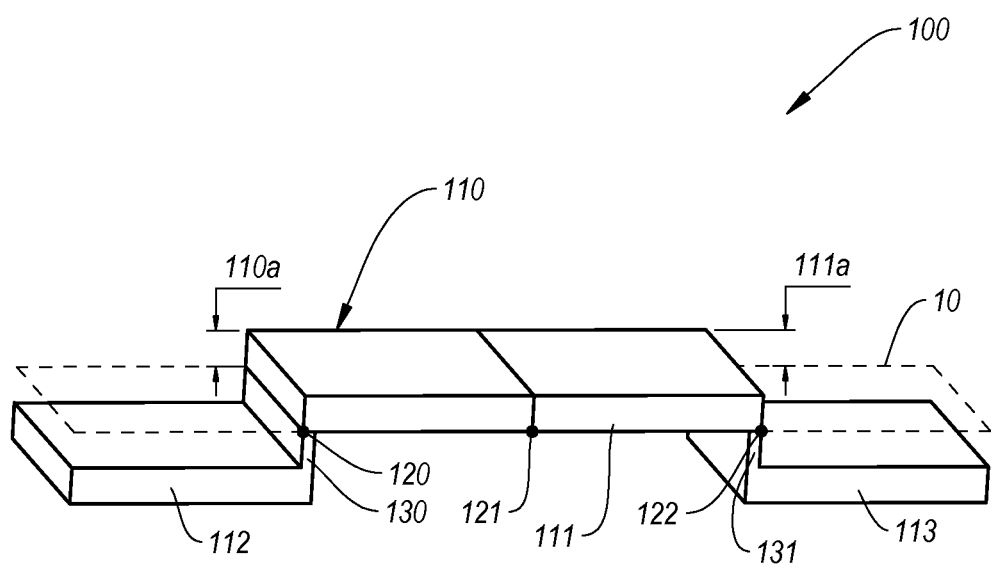
FIG. 1A is an isometric view of a multi-body array in an unfolded configuration according to an embodiment.
Figure 1B:
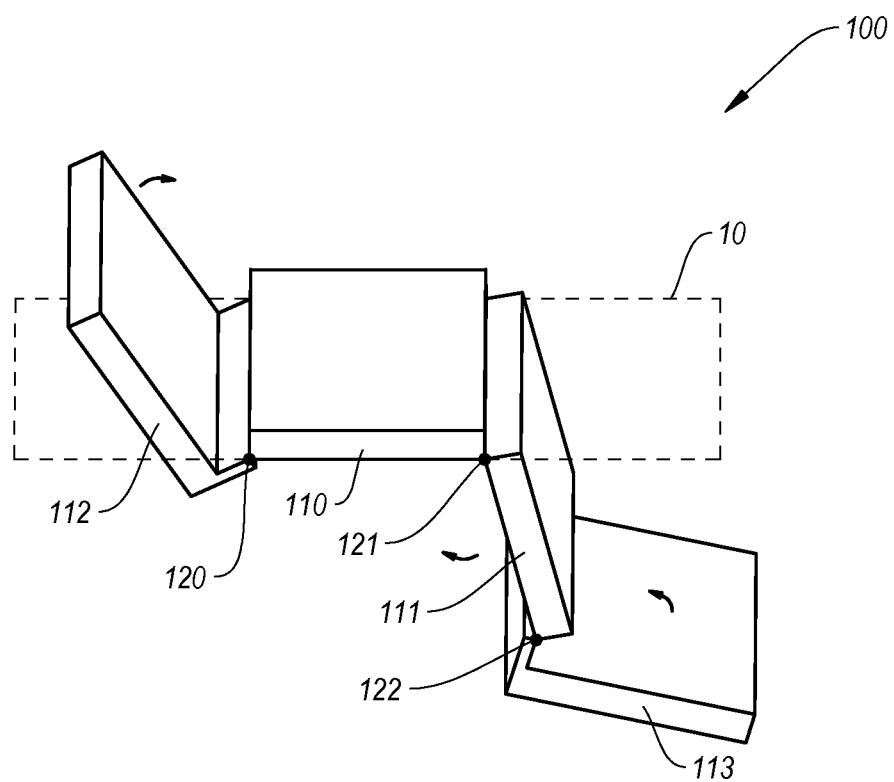
FIG. 1B is an isometric view of the multi-body array of FIG. 1A in a partially folded configuration according to an embodiment.
Figure 1C:
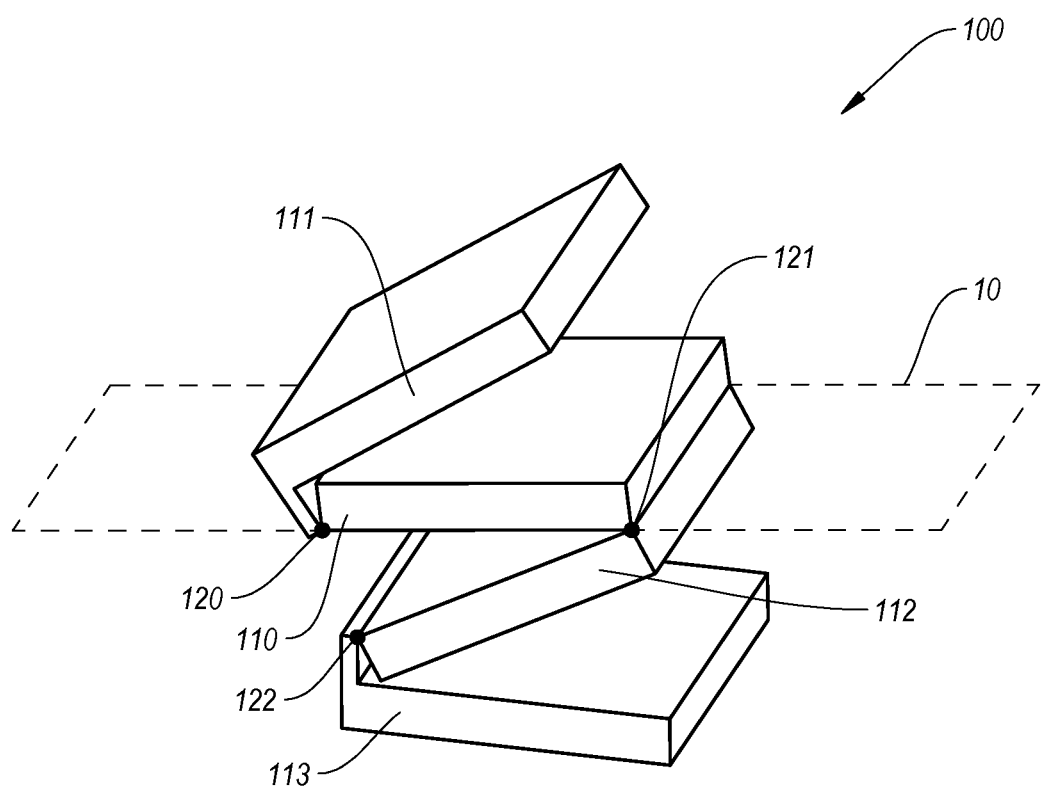
FIG. 1C is an isometric view of the multi-body array of FIG. 1A in a further partially folded configuration according to an embodiment.
Figure 1D:
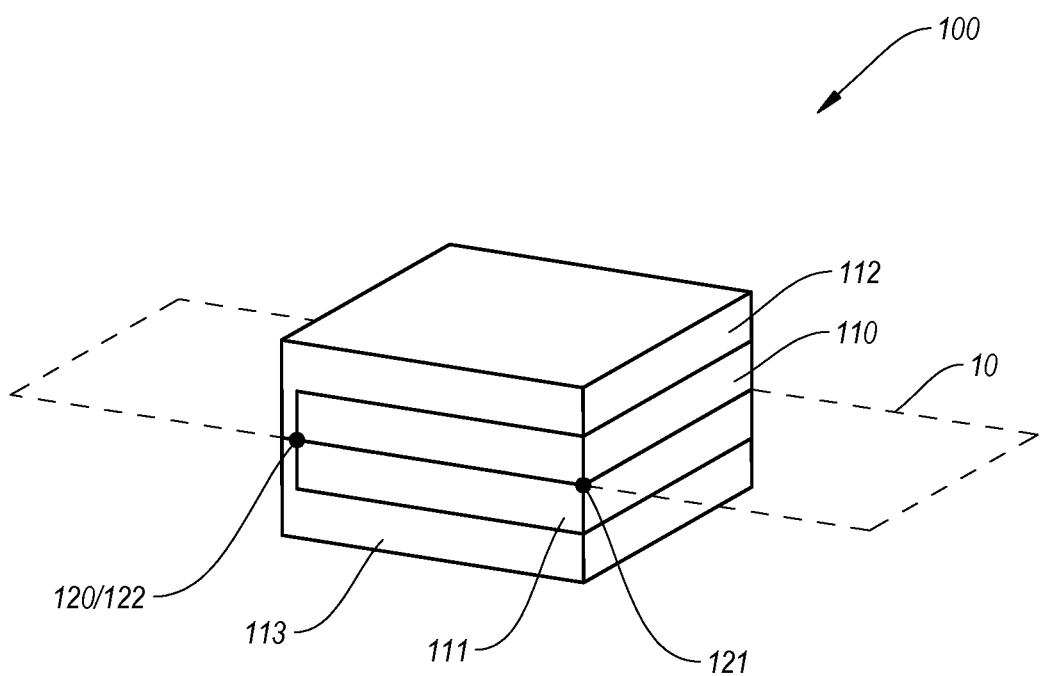
FIG. 1D is an isometric view of the multi-body array of FIG. 1A in a folded configuration according to an embodiment.

FIGS. 1A-1D illustrate a schematic representation of an embodiment of a foldable multi-body array 100 transitioning from an unfolded configuration (FIG. 1A) to a folded configuration (FIG. 1D). For example, as shown in FIG. 1A, the multi-body array 100 may include multiple three-dimensional bodies 110, 111, 112, 113 pivotably connected together by hinges 120, 121, 122. In some embodiments, when the multi-body array 100 is in the unfolded configuration, the hinges 120, 121, 122 may generally lie in the same reference plane (e.g., in an hinge plane 10).

For ease of description, references to "top surfaces" describe visible major surfaces of the bodies 110-113, and reference to "bottom surfaces" describe major surface that are generally opposite to the top surface and are not visible in FIG. 1A. It should be appreciated, however, the multi-body array 100 may be reoriented in any number of ways and surfaces thereof may face in any orientation. In addition, the hinges 120, 121, 122 are identified with enlarged points at pivot axes thereof. It should be appreciated, however, that the multi-body array 100 may include any number of suitable hinges (e.g., flexible hinges, membrane hinges, rigid hinges, etc.), which may vary from one embodiment to the next. As such, in some embodiments, the bodies 110, 111, 112, 113 may be configured to accommodate one or more portions of the hinges 120, 121, 122, in a manner that such portions do not interfere with the bodies 110, 111, 112, 113 during folding or unfolding of the multi-body array 100 into the folded and/or unfolded configuration (e.g., one or more of the bodies 110, 111, 112, 113 may include recesses, cutouts, openings, etc., which may accept one or more portions of the hinges 120, 121, 122 that may otherwise interfere with folding and/or unfolding of the multi-body array 100). For example, the hinges may be positioned such that pivot axes thereof generally lie in the hinge plane.

In some embodiments, at least a portion of the body 110 may generally lie in the hinge plane 10. For example, at least a portion of the bottom surface of the body 110 may generally lie in the unfolded hinge plane 110. In an embodiment, the bottom surface of the body 110 may be coincidental with the hinge plane 10.

In an embodiment, the multi-body array 100 may include one or more protrusions (e.g., protrusions 130, 131) that may connect offset bodies (e.g., offset bodies 112 and 113) to corresponding hinges (e.g., hinges 120, 122). Generally, the protrusions 130, 131 may be connected to the respective bodies 112 and 113 in any number of ways and with any number of suitable mechanisms. For instance, the protrusions 130, 131 may be glued, fastened, or otherwise secured to the bodies 112, 113, respectively. Alternatively or additionally, the protrusions 130, 131 may be integrally formed with the bodies 112, 113, respectively.

In any event, the protrusions 130, 131 may extend away from at least a portion of each of the respective bodies 112, 113 toward or to the hinge plane 10 (e.g., in a manner that would position the respective hinges 120, 122 in the hinge plane 10). Consequently, in some embodiments, one or more portions of the bodies 112, 113 may be offset from the hinge plane 10 and/or from at least one surface of the body 110. In particular, for instance, the protrusion 130 may offset the body 112 from the hinge plane 10 in a manner that facilitates folding the body 112 onto the body 110 (e.g., in a manner that accommodates the thickness of the body 110, which may extend between the hinge plane 10 and a top surface of the body 110).

Similarly, the body 113 may be offset from the hinge plane 10 in a manner that facilitates folding the body 113 onto the body 111. For example, the top surface of the body 113 may be offset from the hinge plane 10, such that folding the body 113 onto the body 111 may place the top surface of the body 113 near or adjacent to a top surface of the body 111. In any event, in some embodiments, bodies 112, 113 may include respective offset surfaces (e.g., top surfaces) which may be offset from the hinge plane in a manner that after the bodies 112, 113 are folded onto or near the respective bodies 110, 111, the offset surfaces may have sufficient offset or distance from the hinge plane 10 to accommodate the respective thicknesses of the bodies 110, 111. It should be appreciate that, because the bodies may have any number of suitable shapes and sizes, the term "offset surface" is used to describe an actual or an imaginary surface (e.g., may be tangent to one or more portions of a non-planar surface) that may be define one or more points or portions of the body, which may be portions of the body that are closest to the hinge plane.

In other words, in some embodiments, respective heights of the protrusions 130, 131 may produce sufficient offset between the respective top surfaces of the bodies 112, 113 and the hinge plane 10 to accommodate folding together bodies 110 and 112 as well as bodies 111 and 113. For instance, the height of the protrusion 130 may be equal to or greater than thickness 110a of the body 110 (e.g., as defined by the distance between top and bottom surfaces (or between the hinge plane 10 and the top surface of the body 110). Similarly, the height of the protrusion 131 may be equal to or greater than thickness 111a of the body 111 (e.g., as defined by the distance between top and bottom surfaces (or between the hinge plane 10 and the top surface of the body 110). Accordingly, as described below in more detail, when the bodies 110 and 112, as well as bodies 111 and 113 are folded together, the respective protrusions 130, 131 may produce sufficient offsets, such that the bodies 110, 111, 112, 113 do not physically interfere with one another when the multi-body array 100 is reconfigured from the unfolded configuration into the folded configuration.

Accordingly, some of the bodies of the multi-body array 100 may be offset from the hinge plane 10 by the protrusions 130, 131 that may connect such bodies to corresponding hinges. Moreover, direction of the offset between a body and the hinge plane 10, when the multi-body array 100 is in the unfolded configuration, may depend on the direction of the pivoting or folding of the offset body. For instance, the protrusion may offset the body from the hinge plane 10 such that the body pivots generally (or partially) toward the hinge plane 10 during reconfiguration of the multi-body array 100 from the unfolded configuration to the folded configuration. As described below in more detail, in some embodiments, some of the bodies may be offset from the hinge plane 10 in a first direction, while other bodies may be offset from that hinge plane 10 and a second, opposite direction. Furthermore, protrusions connecting bodies to corresponding hinges may have sufficient length to accommodate any number of intervening bodies that may otherwise interfere with folding or pivoting of the offset bodies during the folding of the multi-body array 100 into the folded configuration.

As such, protrusions (e.g., protrusions 130, 131) may facilitate the bodies of the multi-body array 100 (e.g., bodies 110, 111, 112, 113) having any suitable size and/or suitable thickness. For example, the bodies may have generally plate- or panel-like shapes, box-like shapes, partially spherical shapes, irregular shapes, etc. Furthermore, it should be appreciated that any of the bodies may be solid throughout or may be at least partially hollow. Likewise, any of the bodies may include any number of recesses or openings therein.

Accordingly, the bodies 110, 111, 112, 113 may include any number of functional components (e.g., electronic functional components, such as displays, solar panels, diffractive optical elements that collectively form a Fresnel lens, radar emitters, antennas, circuit boards, etc.), may accommodate any number of suitable objects therein, etc. For example, any of the bodies 110, 111, 112, 113 may include or incorporate any number of the following or combinations thereof: display, solar panel, etc. Alternatively or additionally, any of the bodies 110, 111, 112, 113 may be configured to store one or more items (e.g., any of the bodies 110, 111, 112, 113 may have a cavity or open space therein that may accommodate storage of any suitable item therein).

In any event, the protrusions connecting the bodies to corresponding hinges may produce sufficient offset between the hinge plane 10 and such bodies to accommodate pivoting or folding thereof to reconfigure the multi-body array 100 between folded and unfolded configurations. Hence, the protrusions may have any suitable shape and/or size to produce the offset between the offset bodies and the hinge plane 10. In an embodiment, the protrusions 130, 131 may have generally prismoid shapes (e.g., may have rectangular cross-section along the lengths thereof). Alternatively or additionally, the protrusions may have arcuate shapes, irregular shapes, or any number of suitable shapes and sizes. Moreover, multiple protrusions may secure the body at one or more hinges.

In addition, the multi-body array 100 may include one or more bodies that at least partially lie in the hinge plane 10 and are not offset therefrom (e.g., in addition to the body 110). For example, at least a portion of the body 111 may generally lie in the hinge plane 10 (e.g., bottom surface of the body 111 may be coincidental to the hinge plane 10). As noted above, in some embodiments, the hinges of the multi-body array 100 may generally lie in the hinge plane 10 and/or the bottom surface of the body 110 may generally lie in the hinge plane 10. Hence, the body 111 may fold toward and/or onto the body 111, such that bottom surface of the body 110 and body 111 face each other and/or in contact with each other, as described below.

In any event, as described above, the multi-body array 100 may be reconfigured from the unfolded configuration illustrated in FIG. 1A into the folded configuration (FIG. 1D). FIGS. 1B-1C illustrate a partially folded multi-body array 100. Specifically, as show in FIG. 1B, in at least one embodiment, the bodies 111 and 112 may pivot clockwise, while the body 113 may pivot counterclockwise at the respective hinges 120, 121, 122. It should be appreciated that, even though pivoting or folding may be described as one body folding onto another (e.g., body 112 folding onto the body 110), generally, the bodies may exhibit relative pivoting or folding (e.g., the bodies 110 and 112 may pivot toward each other). In any case, as shown in FIG. 1C, the bodies 110, 111, 112, 113 may continue pivoting toward one another. For instance, as described above, the protrusions 130, 131 may facilitate or accommodate pivoting of the body 112 toward the body 110 and the body 113 toward the body 111 without interference therebetween.

In some embodiments, as shown in FIG. 1D, in the folded configuration, the multi-body array 100 may have some or all of the hinges located in the same plane. For instance, when the multi-body array 100 is in the folded configuration, the hinges 120, 121, 122 may generally lie in the hinge plane 10. In one or more embodiments, one, some, or all of the hinges may generally lie in a plane that be different from the original or hinge plane 10. Furthermore, as mentioned above, in an embodiment, when the multi-body array 100 is in the folded configuration, at least one of the hinges may generally lie in the hinge plane 10.

While FIGS. 1A-1D and the foregoing paragraphs describe at least one configuration of a foldable multi-body array that may be reconfigurable between folded and unfolded configurations, this disclosure is not so limited. In particular, foldable multi-body arrays may include any number of bodies that may have any number of suitable shapes, sizes, and configurations (e.g., indents, openings, etc.). Moreover, in some embodiments, the bodies of the multi-body array may be connected by independent hinges, which may permit independent pivoting of one, some, or all of the bodies relative to other bodies (e.g., the body 111 may pivot about the hinge 120 independently of the body 113, which may pivot about the hinge 122).

For example, a two-dimensional, rigidly foldable origami (e.g., origami that may fold only at creases between sections or panels thereof) may be reconfigured into a foldable multi-body array by substituting three-dimensional bodies for one, some, or all two-dimensional panels of the two-dimensional origami, and providing suitable protrusions to accommodate pivoting of such three-dimensional bodies (e.g., to provide suitable offset between the hinge plane and the three-dimensional bodies to accommodate or avoid otherwise interfering bodies or portions thereof when the foldable multi-panel array is reconfigured from the unfolded into the folded configuration). Alternatively, however, the multi-body array may include some or all of the bodies that may pivot or fold in an interdependent manner (e.g., pivoting of two bodies about one hinge may force pivoting of all of the bodies about respective hinges in a manner that folds the multi-body array from the unfolded configuration into the folded configuration or unfolds the folded multi-body array into the unfolded configuration).

Figure 2A:
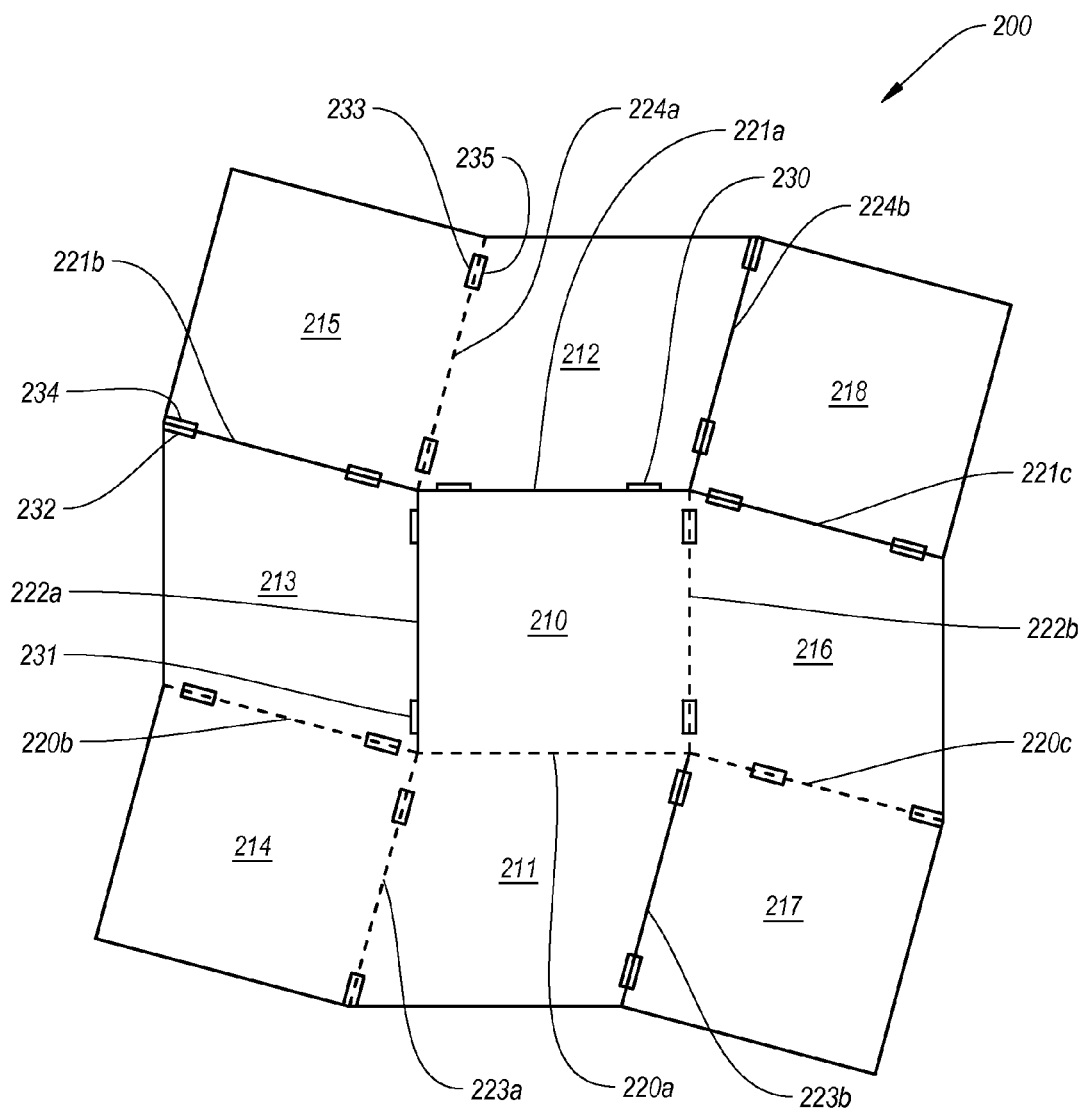
FIG. 2A is a top view schematic representation of a multi-body array according to an embodiment.
Figure 2B:
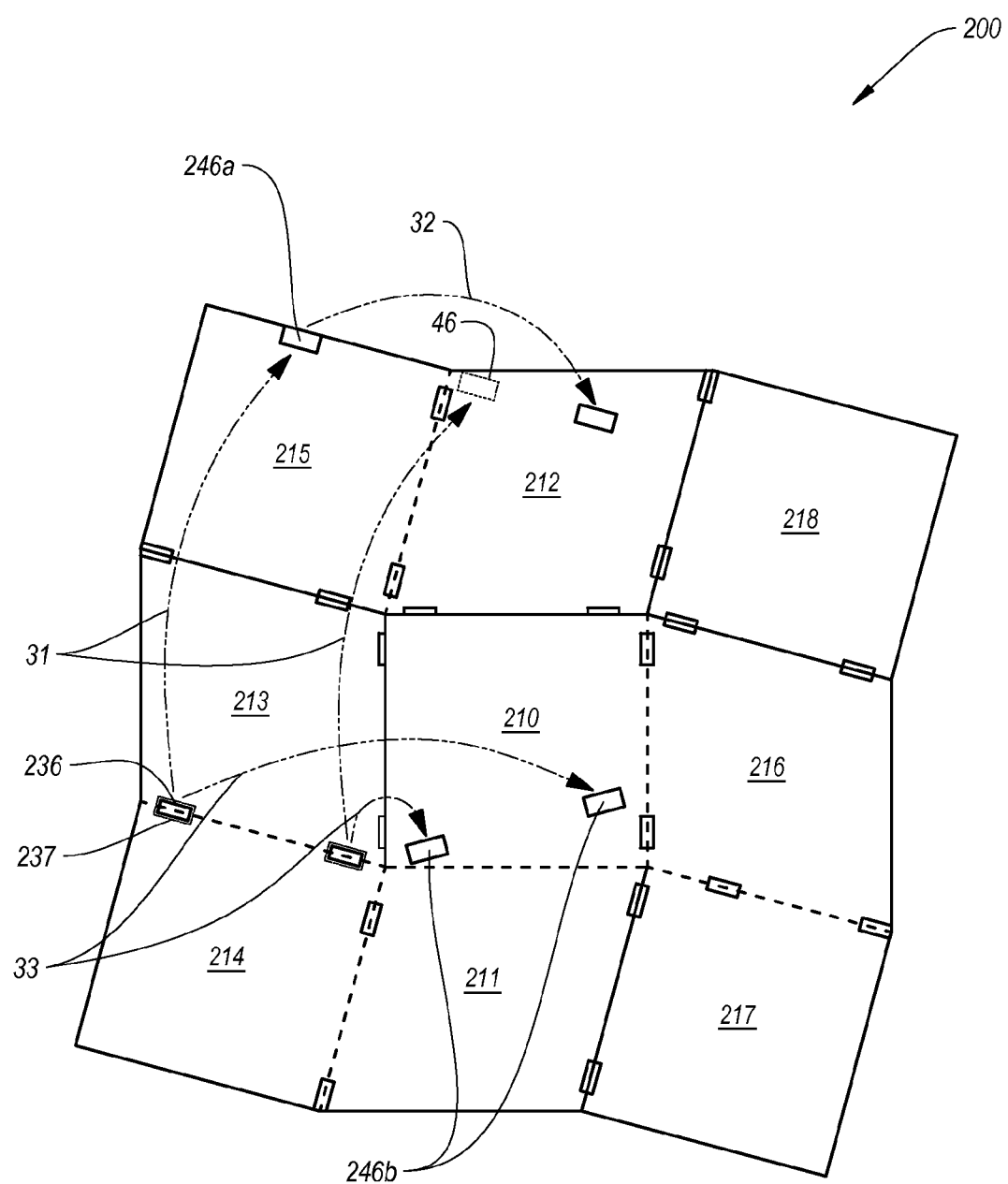
FIG. 2B is a top view schematic representation of the multi-body array of FIG. 2A, with fold projections for identifying openings according to an embodiment.

For example, FIGS. 2A-2C illustrate a schematic of a mountain, mountain, valley, valley ("MMVV") square twist crease fold pattern origami that may be modified from a two-dimensional construction to include three-dimensional bodies, according to one or more embodiments. More specifically, FIG. 2A illustrates a schematic of a multi-body array 200 that may include (or may be modified to include) bodies 210, 211, 212, 213, 214, 215, 216, 217 foldably connected one to another with corresponding hinges 220*a-c*, 221*a-c*, 222*a-b*, 223*a-b*, 224*a-b*. Except as otherwise described herein, the multi-body array 200 may be similar to or the same as the multi-body array 100 (FIGS. 1A-1D).

FIG. 2A illustrates the multi-body array 200 in an unfolded configuration. In at least one embodiment, the hinges 220*a-c*, 221*a-c*, 222*a-b*, 223*a-b*, 224*a-b* may generally lie in the same hinge plane. As mentioned above, the multi-body array 200 may be reconfigured into the folded configuration. For example, the hinges 220*a-c*, 221*a-c*, 222*a-b*, 223*a-b*, 224*a-b* may facilitate relative pivoting or folding of corresponding bodies 210-218 associated therewith, such that the multi-body array 200 may be reconfigured from the unfolded configuration into the folded configuration. Generally, the hinges are illustrated schematically, and it should be appreciated that the multi-body array 200 may include any suitable hinges (e.g., as described above in connection with FIGS. 1A-1D). Solid lines indicate mountain- or peak-type folding, and dashed lines indicate valley-type folding between bodies separated thereby.

For ease of description, (similar to FIGS. 1A-1D) references to "top surfaces" describe visible major surfaces of the bodies 210-218, and reference to "bottom surfaces" describe major surface that are opposite to the top surface and are not visible in FIG. 2A. It should be appreciated, however, the multi-body array 200 may be reoriented in any number of ways and surfaces thereof may face in any orientation. In any event, in at least one embodiment, body 211 may be pivoted about the hinge 220*a*, such that the top surfaces of the bodies 210, 211 move toward each other and/or contact each other. Moreover, the bodies 213, 214 may be pivoted about the hinge 220*b*, such that the top surfaces thereof move toward each other and/or contact each other. Likewise, the bodies 216, 217 may be pivoted about the hinge 220*c*, such that the top surfaces thereof move toward each other and/or contact each other.

In some embodiments, the body 210 may include an approximately planar top surface. Also, the top surface of the body 210 may be coincident with an unfolded hinge plane of the multi-body array 200 (e.g., plane in which all hinges may generally lie when the multi-body array 200 is in the unfolded configuration). It should be appreciated, however, that the body 210 may have any number of suitable configurations, which may include at least partially non-planar surfaces (e.g., stepped, recessed, etc., such as to accommodate surface(s) of one or more bodies when the multi-body array is in the folded configuration), curved surfaces, irregular surfaces, etc.

Similarly, to reconfigure the multi-body array 200 into the folded configuration, in at least one embodiment, the bodies 210, 212 may be pivoted about the hinge 221*a*, such that the bottom surfaces thereof move toward each other and/or contact each other. In addition, the bodies 213, 215 may be pivoted about the hinge 221*b*, such that the bottom surfaces thereof move toward each other and/or contact each other. Also, the bodies 216, 218 may be pivoted about the hinge 221*c*, such that the bottom surfaces thereof move toward each other and/or contact each other.

Furthermore, to reconfigure the multi-body array 200 into the folded configuration, the bodies 215, 213, 214 may pivot about respective hinges 224*a*, 222*a*, 223*a*, such that the body 215 may be positioned over the body 212 (e.g., top surfaces thereof may be in contact with each other); the body 213 may be positioned over the body 215 (e.g., bottom surfaces thereof may be in contact with each other); the body 214 is positioned over the body 213 (e.g., top surfaces thereof may be in contact with each other). Furthermore, the bodies 218, 216, 217 may pivot about respective hinges 221*c*, 222*b*, 220*c*, such that the body 217 is positioned under the body 211 (e.g., bottom surfaces thereof may be in contact with each other); the body 216 may be positioned under the body 217 (e.g., top surfaces thereof may be in contact with each other); the body 218 may be positioned under the body 216 (e.g., bottom surfaces thereof may be in contact with each other).

Hence, in the folded configuration, the bodies of the multi-body array 200 may be arranged in the following sequence: At least a portion of the body 210 may be located at an original location or plane (e.g., the top surface of the body 210 may be at the hinge plane). The bodies 212, 215, 213, and 214 may be positioned above the body 210 (e.g., on top of and/or above the top surface thereof) in the listed sequence. Moreover, in some embodiments, orientations of the top and bottom surfaces of the bodies 212, 215, 213, and 214 may be alternating (e.g., the top surface of the body 212 may face upward, while the top surface of a subsequent body 215 may face downward). The bodies 211, 217, 216, 218 may be positioned under the body 210 (e.g., on under and/or below the bottom surface thereof) in the listed sequence. In addition, orientations of the top and bottom surfaces of the bodies 212, 215, 213, and 214 may be alternating (e.g., the top surface of the body 211 may face upward, while the top surface of a subsequent body 217 may face downward).

In other words, when the multi-body array 200 is in the folded configuration, bodies 212, 215, 213, and 214 may be offset bodies (e.g., offset from the hinge plane), which may have an offset surface that may face the hinge plane and may be offset therefrom by an offset distance that is at least equal to the sum of thicknesses of interfering or intervening elements (e.g., bodies, protrusions, hinges, etc.) between the offset surface and the hinge plane. For example, in the folded configuration the bottom surface of the offset body 212 may be the offset surface thereof (e.g., may face the hinge plane); the offset surface of the body 212 may be offset from the top surface of the body 210. In particular, the offset surface of the body 212 may be at an offset distance that equals at least to the thickness of the body 210, which may be between the offset surface of the body 212 and the hinge plane. Also, the top surface of the offset body 215 may be the offset surface thereof and may be offset from the hinge plane. Specifically, for instance, the offset distance between the offset surface 215 and the hinge plane may be at least to the sum of thicknesses of the body 210 and body 212 (the body 212 may be positioned between the offset surface and the bottom surface of the body 210; the thickness of body 210 may be the distance between the bottom surfaces thereof and the hinge plane).

Similarly, in the folded configuration the offset bodies 217, 216, 218 may have an offset surface that may face and may be offset from the hinge plane by the sum of thicknesses of the intervening elements. For example, the bottom surface of the offset body 217 may be the offset surface thereof, which may be offset from the hinge plane by an offset distance. More specifically, the offset distance between the offset surface of the body 217 and the hinge plane may be at least the thickness of the body 211, which may be positioned between the hinge plane and the offset surface of the offset body 217. Likewise, the top surface of offset body 216 may be the offset surface thereof, which may be offset from the hinge plane by an offset distance. For instance, the offset distance between the offset surface of the body 216 and the hinge plane may be the sum of thicknesses of the bodies 211, 217, which may be positioned between the offset surface of the offset body 216 and the hinge plane. It should be appreciated that, in at least one embodiment, the top surface of the body 211 may be in contact with the top surface of the body 210 (e.g., the top surface of the body 211 may generally lie in or may be generally coincidental to the hinge plane, such that the offset distance for the top surface of the body 211 substantially zero).

As described above, the bodies 210-218 may have any number of suitable thicknesses. Moreover, as described above, the hinges 220a-c, 221a-c, 222a-b, 223a-b, 224a-b, which may connect together the bodies 210-218, may generally lie in the same reference plane when the multi-body array 200 is in the unfolded configuration (e.g., in the hinge plane, which may be coincidental with the top surface of the body 210). Hence, for example, when the multi-body array 200 is in the unfolded configuration, offset surfaces of corresponding offset bodies 212-218 may be offset or positioned at the respective, suitable offset distances from the hinge plane. Furthermore, in some embodiments, when the multi-body array is in the folded configuration, the hinges 220a-c, 221a-c, 222a-b, 223a-b, 224a-b may generally lie in the same reference plane (e.g., in the original hinge plane).

As described above, for instance, when the multi-body array 200 is in the folded configuration, offset bodies that were folded to stack on top of and/or above the top surface of the body 210 may have one or more intervening elements (e.g., one or more bodies, protrusions, hinges, or combinations thereof) between respective offset surfaces thereof and the hinge plane. Hence, to accommodate such intervening elements, each of the offset bodies may be offset from the hinge plane when the multi-body array 200 is in the unfolded configuration. More specifically, in the unfolded configuration, each offset body may be offset from the hinge plane by the offset distance that, as described above, may be the sum of thicknesses of the intervening elements between the hinge plane and the offset surface of the offset body (when the multi-body array 200 is in the folded configuration).

Also, when the multi-body array 200 is in the folded configuration, offset bodies folded to stack under and/or below the bottom surface of the body 210 may have one or more intervening elements (e.g., one or more bodies, protrusions, hinges, or combinations thereof) between offset surfaces thereof and the hinge plane. Hence, to accommodate such intervening elements, each of the offset surfaces of the offset bodies may be offset from the hinge plane by respective offset distances, when the multi-body array 200 is in the unfolded configuration. Specifically, the offset distances between the respective offset bodies and the hinge plane may facilitate folding the multi-body array 200, such as to position the intervening elements between the offset surfaces of the offset body and the hinge plane. More specifically, when the multi-body array 200 is in the unfolded configuration, each of the offset surfaces of the corresponding offset bodies may be offset from the hinge plane by a corresponding offset distance, which may be the sum of thicknesses of the intervening elements between the hinge plane and the corresponding offset surface. It should be appreciated that such sum of thicknesses may include the thickness of the body 210, as the body 210 may intervene between the offset surfaces of the offset body and the hinge plane.

Generally, the offset bodies may be offset from the hinge plane in any number of ways and with any number of suitable mechanisms. In some embodiments, as described above, the multi-body array 200 may include one or more protrusions (e.g., protrusions 230-235) that may position the offset bodies at corresponding offset distances from the hinge plane. For instance, the offset surface of the body 212 may be offset from the hinge plane by an offset distance that may be at least the thickness of the body 210. Generally, the direction of offset of the offset surface from the hinge plane may be opposite to the direction of the pivoting or folding of the body 212. In other words, the direction of the offset may be such that after the body 212 is folded onto the body 210, the offset surface of the body 212 may be at the offset distance from the hinge plane, such as to accommodate the body 210 therebetween.

Hence, in at least one embodiment, the hinges 230 may be connected to or incorporated with the body 212 and may offset the body 212 from the hinge plane to produce offset distance therebetween. Moreover, as noted above, the protrusions may hingedly connect the offset body to one or more bodies (e.g., the hinges about which the offset body pivots may remain in the hinge plane). For instance, the hinge(s) 221a may secure the protrusions 230 to the top surface of the body 210 (e.g., at the hinge plane). As mentioned above, the hinges 220a-c, 221a-c, 222a-b, 223a-b, 224a-b and protrusions are illustrated schematically; hence, the protrusion may be connected to other protrusions and/or to bodies with one or more hinges.

In an embodiment, the body 213 may pivot about the hinge 222a, such that the bottom surface thereof faces hinge plane and the bodies 212, 215, which separate the body 213 from the hinge plane. Hence, for example, the offset surface of the body 213 may be offset from the hinge plane by an offset distance that is equal to at least the sum of thicknesses of the bodies 212, 215. For instance, one or more protrusions 231 may offset the body 213 and the offset surface thereof by the suitable distance relative to the hinge plane (e.g., in the direction that is generally opposite to pivoting of the body 213, such as out of the plane or in the direction of the top surface body 213).

Moreover, as described above, the bodies 213 and 215 may pivot about the hinge 221b, such that bottom surfaces thereof move toward each other and/or contact each other. Hence, offset surface of the body 213 may be offset from the body 215 (e.g., from the bottom surface of the body 215) at least by the thickness of the body 215, such as to accommodate folding together. More specifically, in an embodiment, the body 213 may be offset from the body 215 by one or more protrusions 232, such that the offset surface of the body 213 is offset from the top surface of the body 212 by at least the thickness of the body 215.

As mentioned above, the bodies 212, 215 may be positioned above the hinge plane and above the top surface of the body 210, and may be between the offset surface of the body 213 (e.g., bottom surface thereof) and the hinge plane, when the multi-body array 200 is in the folded configuration. Hence, the offset distance between the offset surface of the body 215 and the hinge plane may be sufficient to accommodate the bodies 212, 215 therebetween (e.g., the offset distance between the hinge plane and the offset surface of the body 213 may be at least the sum of the thicknesses of the bodies 212, 215). For instance, the body 215 may be offset from the body 210 by protrusions 233, 234.

As described above, the body 212 may be offset from the hinge plane and from the body 210 by protrusions 230. As such, to facilitate the relative offset between the bodies 212 and 215 (e.g., since the body 212 may be offset by at least the thickness of the body 210, and the body 212 may be offset by at least the sum of thicknesses of the body 215 and the body 210), the body 212 may include a protrusion 235, which may extend toward the body 215 and toward the protrusions 233. In some embodiments, the hinge(s) 224a may connect together the protrusions 233 and 235, thereby pivotably connecting the bodies 212 and 215. For example, the protrusions 235 may extend from the body 212 downward toward the hinge plane and the protrusions 233 may extend upward from the body 215 toward the hinge plane, and the hinge 224a therebetween may generally lie in the hinge plane.

Also, when the multi-body array 200 is in the folded configuration, the body 213 may have a greater offset distance or may be farther from the hinge plane than the body 215. Hence, the protrusions 232, 234 may accommodate the relative offset between the bodies 215 and 213, and the hinge 221b may be formed between the protrusions 232, 234. For example, the protrusions 232 may extend downward from the body 213 toward the hinge plane, and the protrusions 234 may extend upward from the body 215 toward the hinge plane and may be connected to the protrusion 232 by the hinge 221b, which may generally lie in the hinge plane.

In some embodiments, at least one body may have no offset from the body 210. For example, the body 211 may have the top surface thereof generally lying in the same plane as the body 210 (e.g., in the hinge plane). Accordingly, the top surface of the body 211 may be directly connected to the top surface of the body 210 with one or more hinges, such as with a hinge 220a, which may generally lie in the hinge plane.

Furthermore, as mentioned above, the hinges 220a-c, 221a-c, 222a-b, 223a-b, 224a-b may connect the bodies 210-218 in an interdependent manner, such that pivoting of two bodies may produce pivoting of some or all other bodies to reconfigure the multi-body array between the folded and unfolded configurations. In at least one embodiment, some of the bodies may be connected to multiple other bodies with multiple hinges, which may have non-parallel orientation relative to one another. For example, the body 211 may be connected to the body 210 with the hinge 220a, and to the body 214 with the hinge 223a, and the hinges 220a and 223a may have non-parallel orientation relative to each other (e.g., the hinges 220a and 223a may form an obtuse angle therebetween).

While the above describes offsets and protrusion of only some of the bodies, it should be appreciated that all of the bodies (that have not been specifically described) may be offset from the hinge plane based on the principles described above. Furthermore, in some embodiments, when the multi-body array 200 is in the folded configuration, some or all of the hinges may generally lie in the same plane (e.g., hinge plane). In at least one embodiment, the hinge plane in the folded configuration may be the same as or coincide with the hinge plane in the unfolded configuration. Also, to facilitate positioning the hinges in the same plane, in some instances, one or more bodies may have openings that may allow one or more corresponding protrusions to pass therethrough and toward or to the hinge plane (when the multi-body array is reconfigured into the folded configuration).

FIG. 2B illustrates one embodiment of locating the openings in the bodies, such as to allow protrusions to pass therethrough and to the hinge plane. In particular, for instance, protrusion locations may be projected onto bodies based on the pivoting thereof. For example, protrusions 236, 237, which may extend from and connect together respective bodies 213, 214 with the hinge 220b, may be projected onto body 215, as indicated with first fold projection lines 31. Specifically, the body may include an opening 246a that may allow the corresponding protrusion 236 to pass through the body 215. It should be noted that, in some instances, openings may project off the body onto which the protrusions would be folded (e.g., location 46) may not need to be added to other body onto which such opening was projected.

Furthermore, as described above, a body may be separated or offset from the hinge plane by one or more bodies. As such, the folding paths of the protrusions may be further projected through subsequent folds of the multi-body array 200 to determine locations of the openings in additional or alternative bodies. For instance, the protrusions 236, 237 may be projected onto the body 210 (as noted above, the thickness of the body 210 may separate the offset surface of the body 213 from the hinge plane). Hence, for example, projection lines 33 may project protrusions 236, 237 onto the body 210 to determine locations of openings 246b, which may allow the protrusions 236, 237 to pass through the thickness of the body 210 and to the hinge plane. The same procedure may be used to determine locations for all openings in the bodies, which may be necessary to allow various protrusions to pass through the intervening bodies and to the hinge plane.

Figure 3A:
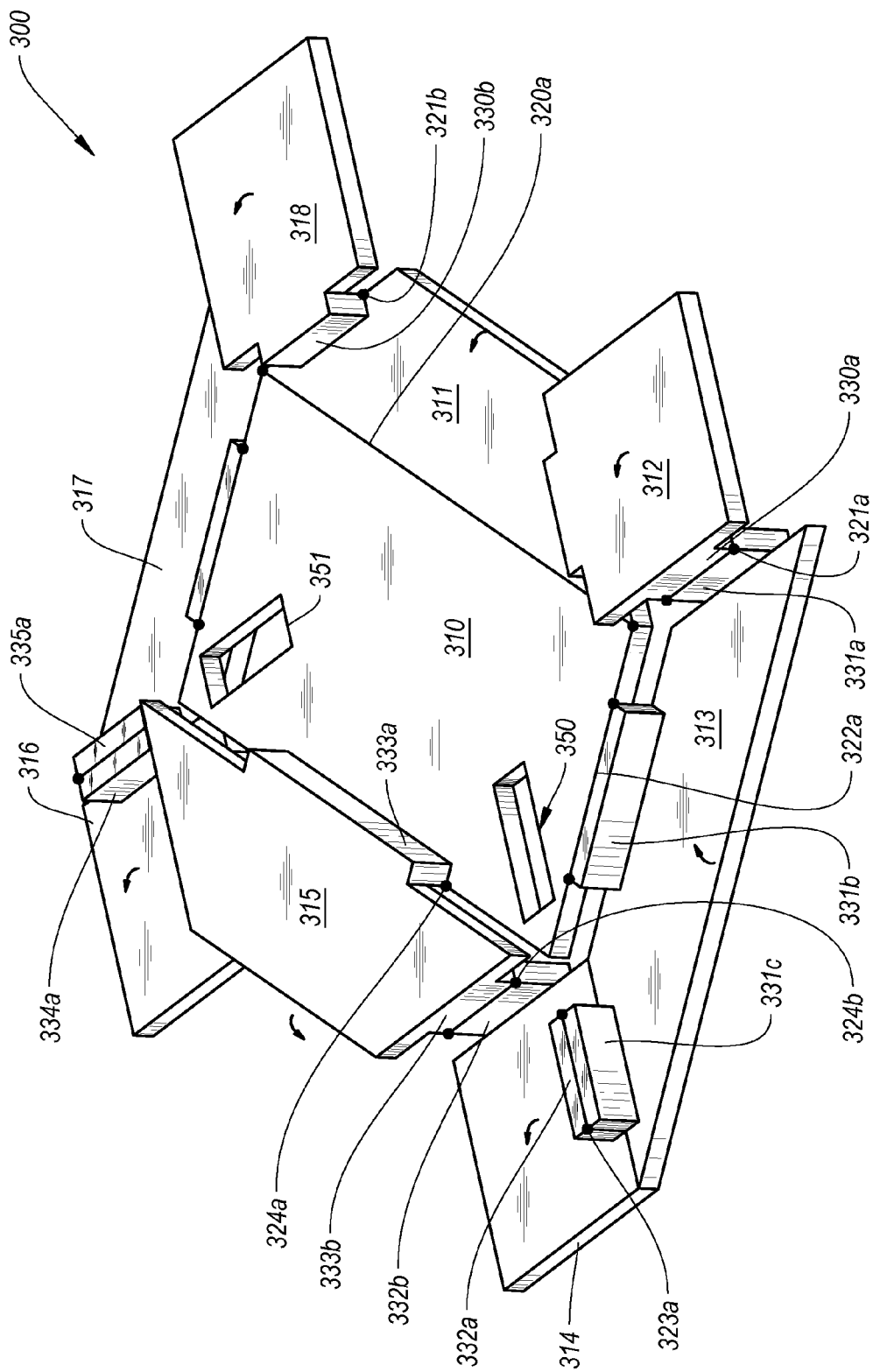
FIG. 3A is a top isometric view of a multi-body array in an unfolded configuration according to an embodiment.
Figure 3B:
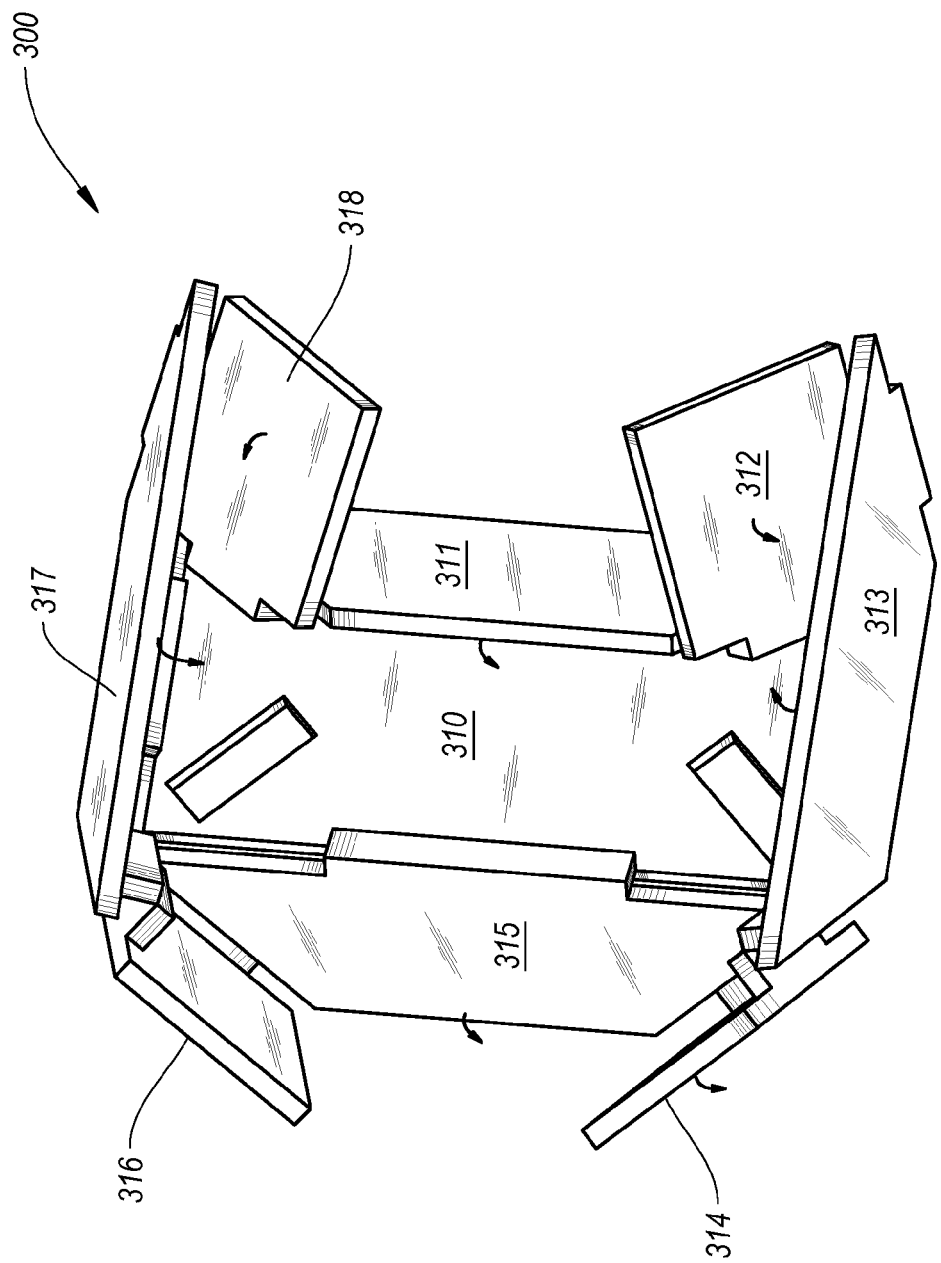
FIG. 3B is a top isometric view of the multi-body array of FIG. 3A in a partially folded configuration according to an embodiment.
Figure 3C:
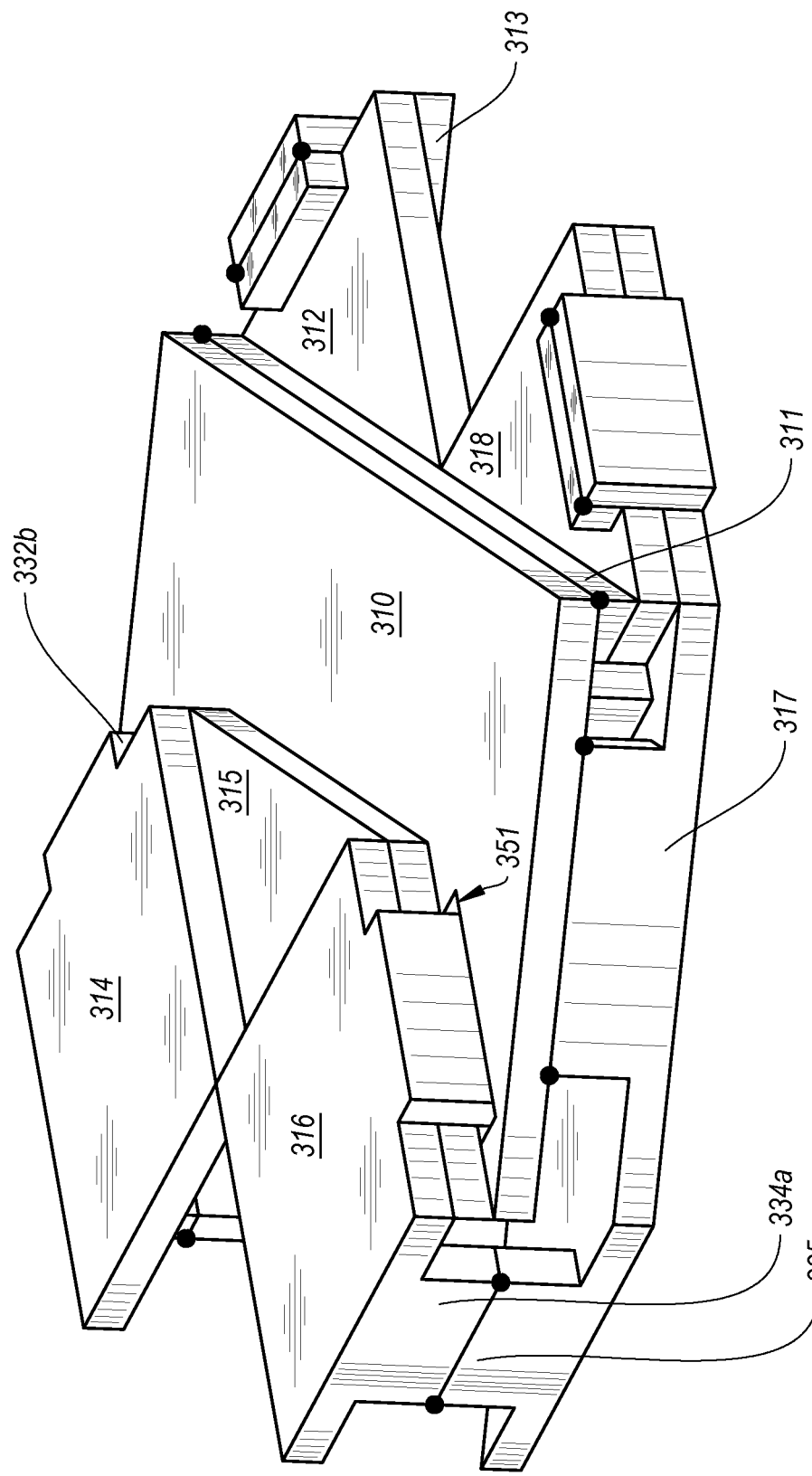
FIG. 3C is a bottom isometric view of the multi-body array of FIG. 3A in a folded configuration according to an embodiment.

As mentioned above, any rigidly foldable origami may be modified to include one or more three-dimensional bodies to form a multi-body array according to one or more embodiments described herein. FIGS. 3A-3C illustrate an embodiment of a multi-body array 300, which may be reconfigured between unfolded configuration (FIG. 3A) and folded configuration (FIG. 3C), according to an embodiment. More specifically, in FIG. 3A the multi-body array 300 is illustrated in the unfolded configuration and with top surfaces of a body 210 faces upward (e.g., visible); in FIG. 3C, the multi-body array 300 is illustrates in the folded configuration but flipped over (for visibility of additional features), such that the top surface of the body 210 face downward (not visible) and the bottom surface thereof faces upward (visible). As mentioned above, references to top and bottom surfaces and to upward and downward directions are used for ease of description and are not intended to limit the embodiments to a particular orientation. Except as otherwise described herein, the multi-body array 300 and its elements and components may be similar to or the same as any multi-body arrays 100, 200 (FIGS. 1A-2B) and their respective elements and components.

As shown in FIG. 3A, in at least one embodiment, the multi-body array 300 may include multiple hinges that may connect together corresponding bodies of the multi-body array 300. Moreover, in some embodiments, some or all of the hinges may generally lie in a hinge plane. For instance, the multi-body array 300 may include a body 310, which may include a top surface that is substantially coplanar or coincidental with the hinge plane. In an embodiment, the multi-body array 300 may include bodies 311-318 hingedly connected to the body 310 and to one another. In some embodiments, the hinges connecting the bodies 310-318 may generally lie in the same reference plane (e.g., in the hinge plane). Moreover, as described above, some or all of the bodies may be offset from the hinge plane by one or more protrusions, which may hingedly connect the offset bodies to other protrusions and/or to other bodies.

According to at least one embodiment, the top surface of the body 310 and the top surface of the body 311 may generally lie in the hinge plane, and the bodies 310, 311 may be pivotably connected together by a hinge 320a, which may also generally lie in the hinge plane. Generally, bodies 310-318 may pivot or fold in a manner identified by the arrows in FIG. 3A. For instance, the body 311 may be folded onto the body 310 (as can be seen in FIGS. 3B-3C).

For example, the bodies 312 and 318 may generally move or pivot toward the body 310, as indicated with the arrows in FIG. 3A. In some embodiments, when the multi-body array 300 is in the folded configuration, the bodies 312, 318 may generally face in the same direction as in the unfolded configuration (as can be seen in FIGS. 3B-3C). For example, the body 312 may pivot relative to the body 313 about hinge 321a and may pivot about another hinge that may pivotably connect the body 312 to the body 311 (e.g., a hinge that maybe similar to or the same as a hinge 321b, which pivotably connects the body 318 to the body 311). The body 318 may be hingedly connected to the bodies 311 and 317 in a manner that is similar to the hinged connection between the body 312 and bodies 311, 313.

In any event, for instance, when the multi-body array 300 is reconfigured into the folded configuration (FIGS. 3B-3C), the body 312 may be sandwiched between the bodies 311 and 313, and the body 318 may be sandwiched between the bodies 311 and 317. In other words, the offset surfaces of the bodies 312, 318 (e.g., surfaces facing toward the hinge plane) may be positioned at an offset distance from the hinge plane, to accommodate positioning the body 311 between the offset surfaces of the bodies 312, 318 and the hinge plane. Moreover, such offset distance (e.g., distance between the bottom surfaces of the bodies 312, 318 and the hinge plane) may be the same in the folded configuration as in the unfolded configuration. Hence, in the unfolded configuration, the bodies 312, 318 may be offset bodies, which may be offset from the hinge plane by respective protrusions 330a, 330b, such that the offset surfaces of the bodies 312, 318 may be at the offset distance that is at least equal to the thickness of the body 311.

As mentioned above, when the multi-body array 300 is in the folded configuration, the bodies 313, 317 may be positioned above the hinge plane and on top of the bodies 312, 318, respectfully (as shown in FIGS. 3B-3C). For example, the top surfaces of the bodies 313 and 317 may face downward and toward the hinge plane (e.g., the top surface of the body 313 may face and/or may be in contact with the top surface of the body 312, and the top surface of the body 317 may face and/or may be in contact with the top surface of the body 318 (as shown in FIGS. 3B-3C)). In other words, the offset surface of the body 313 (e.g., top surface thereof) may be at an offset distances from the hinge plane, which may be at least equal to the sum of thicknesses of the bodies 311, 312 that may be positioned between the offset surface and the hinge plane. Similarly, the offset surface of the body 317 (e.g., top surface thereof) may be at an offset distances that may be at least equal to the sum of thicknesses of the bodies 311, 318, which may be positioned between the offset surface and the hinge plane.

In some embodiments, the body 313 may be offset from the hinge plane by protrusions 331a, 331b, 331c. More specifically, the protrusions 331a, 331b, 331c may be connected to or at respective hinges 321a, 322a, 323a, which may generally lie in the hinge plane and which may hingedly connect the body 313 to the bodies 313, 310, 314, respectively. In other words, the protrusions 331a, 331b, 331c may extend from the offset surface of the body 313 toward and/or to the hinge plane. For instance, the protrusion 331a may extend toward or to the hinge plane and may be hingedly connected to the protrusion 330a, thereby hingedly connecting the bodies 313 and 312. Similarly, protrusion 331b may extend toward and/or to the hinge plane and may be hingedly connected to or at the top surface of the body 310 by the hinge 323a, which may generally lie in the hinge plane. Also, the protrusion 331c may extend toward and/or to the hinge plane and may be hingedly connected to protrusion 332a of the body 314 by hinge 323a, which may generally lie in the hinge plane. In any event, in some instances, protrusions may be connected to other protrusions and/or bodies, thereby hingedly connecting together bodies of the multi-body array 300.

In an embodiment, bodies 314-316 may pivot and/or fold in a manner that may be similar to the pivot or folding of the bodies 311, 312, 318 (as indicated by the arrows in FIG. 3A and shown in FIGS. 3B-3C). For example, the body 315 may generally pivot toward the bottom surface of the body 310 (e.g., the bottom surface of the body 315 may move toward and/or may contact the bottom surface of the body 310). Hence, the offset surface of the body 315 (e.g., bottom surface thereof) may be offset from the hinge plane, such that after folding onto the body 310, the offset surface may be offset from the hinge plane by the thickness of the body 310 (e.g., to accommodate positioning the body 310 between the offset surface of the body 313 and the hinge plane.

In some embodiments, protrusions may offset the body 315 from the hinge plane. For example, protrusion 333a may hingedly connect the body 315 at hinge 324a, which may generally lie in the hinge plane and may be connected at or near the top surface of the body 310. Furthermore, hinge 333b may also extend from the offset surface of the body 315 toward or to the hinge plane and may be hingedly connected to body 314 with hinge 324b (e.g., to protrusion 332b of the body 314). In any event, the body 315 may fold onto the bottom surface of the body 310 and may be offset from the hinge plane by the thickness of the body 310.

In at least one embodiment, the body 315 may be sandwiched between the bottom surface of the body 310 and top surfaces of the bodies 314, 316 (as shown in FIGS. 3B-3C). As such, the offset surfaces of the bodies 314, 316 (e.g., top surfaces thereof) may be offset from the bottom surface of the body 310 by the thickness of the body 315. Hence, the offset surfaces of the bodies 314, 316 may be offset from the hinge plane by the offset distance that is at least the sum of thicknesses of the bodies 315 and 310. Accordingly, one or more protrusions may extent from the bodies 314, 316 (e.g., extending from respective offset surfaces thereof) toward and/or to the hinge plane (e.g., offsetting the top surfaces of the bodies 314, 316 from the hinge plane).

For example, protrusions 332a, 332b may extend from the body 314 toward and/or to the hinge plane. In an embodiment, the hinge 323a may connect the protrusion 332a to the protrusion 331c (of the body 313), thereby hingedly connecting together the bodies 314 and 313. Analogously, the hinge 324b may connect the protrusion 332b to the protrusion 333b (of the body 315), thereby hingedly connecting together the bodies 314, 315. The body 316 may be hingedly connected to the bodies 315 and 317 in a manner that may be similar to the hinged connections between the body 314 and bodies 313, 315. For instance, protrusion 334a may extend from the body 316 and may hingedly connect the body 316 to the body 317 (e.g., to protrusion 335a of the body 317), thereby offsetting the body 316 from the hinge plane. In any event, the bodies 314 and 316 may be offset from the hinge plane, such that when the multi-body array 300 is reconfigured into the folded configuration, the offset surfaces (e.g., top surfaces) of the bodies 314, 316 may be at an offset distance from the hinge plane, which may be at least equal to the thickness of intervening elements or components positioned between the offset surfaces and the hinge plane (e.g., body 315 and body 310).

Moreover, as mentioned above, in some embodiments, when the multi-body array 300 is reconfigured into the folded configuration, some or all of the hinges may generally lie in the hinge plane (e.g., which may be the same as the hinge plane in the unfolded configuration). As such, in some examples, one or more protrusions (connected to the hinges) may require passing through one or more bodies, which may generally lie between such protrusions and the hinge plane. For example, the body 310 may include openings 350, 351, which may allow one or more protrusions to pass therethrough and toward or to the hinge plane. For instance, protrusions 332b, 333b may enter and/or pass through the opening 350 (when the multi-body array 300 is in the folded configuration), and the protrusions connecting bodies 315, 316 (not visible) may enter and/or pass through the opening 351 (see also FIG. 3C). In any case, in one or more embodiments, the bodies may include sufficient or suitable openings, cutouts, etc., which may accommodate one or more protrusions that may enter and/or pass therethrough to be positioned at or near the hinge plane, when the multi-body array 300 is in the folded configuration.

In one or more embodiments, the bodies of the multi-body array 300 may have one, some, or all substantially planar surfaces. Furthermore, in some embodiments, when the multi-body array 300 is in the unfolded configuration, top and bottom surfaces of the multi-body array 300 may be substantially parallel one to another. In some embodiments, when the multi-body array 300 is in the folded configuration (FIG. 3C), the top and bottom surfaces of the multi-body array 300 also may be parallel one to another and/or may be stacked together (e.g., at least some of the top/bottom surfaces may be contact one another).

In some embodiments, as described above, some or all of the hinges of the multi-body array 300 may lie in the hinge plane (e.g., when the multi-body array 300 is in the unfolded and/or in the folded configurations). Furthermore, in some examples, the hinge plane may not pass through or intersect any of the three-dimensional bodies 310-318. In other words, for instance, each of the three-dimensional bodies 310-318 of the multi-body array 300 may include multiple surfaces, and the hinge plane may be non-intersecting with the three-dimensional bodies 310-318 and/or with the surfaces thereof. It should be appreciated, however, that, as described above, in at least one example, the hinge plane may be parallel to and/or coplanar or coincidental with surfaces of one or more of the three-dimensional bodies 310-318.

As noted above, pivoting of the bodies of the multi-body array 300 may be interdependent (e.g., relative pivoting of two adjacent bodies may produce corresponding pivoting of all of the bodies to reconfigure the multi-body array 300 to the folded or unfolded configuration). In some examples, one or more hinges may be biased in a manner that may reconfigure the multi-body array 300 from the unfolded configuration into the folded configuration or vice versa. Generally, any number of suitable biasing elements may be included in the multi-body array 300 (e.g., springs, pressurized cylinders, elastic bands, etc.). For instance, such hinge(s) and/or one or more biasing elements may be biased by reconfiguring the multi-body array 300 from the unfolded to the folded configuration (e.g., the multi-body array 300 may be maintained or constrained in the folded configuration by one or more restraints; removal of the restraints may allow the biasing element to reconfigure the multi-body array 300 into the unfolded configuration). Also, such hinge(s) and/or one or more biasing elements may be biased by reconfiguring the multi-body array 300 from the folded to the unfolded configuration (e.g., the multi-body array 300 may be maintained or constrained in the unfolded configuration by one or more restraints; removal of the restraints may allow the biasing element to reconfigure the multi-body array 300 into the folded configuration). Alternatively or additionally, one or more drivers (e.g., motors, powered pistons, etc.), which may produce relative pivoting between at least two bodies of the multi-body array 300, thereby reconfiguration the multi-body array 300 between the folded and unfolded configurations.

In some embodiments, the multi-body array may include two or more bodies that may interfere or intersect with one another as the bodies pivot relative to one another and the multi-body array is reconfigured from unfolded configuration into the folded configuration or vice versa. For example, the multi-body array may be reconfigured from the unfolded into a partially folded configuration, as the interference or intersection between two or more bodies may prevent the multi-body array from being reconfigured into the fully folded configuration (e.g., as described above). Except for the interference between two or more bodies (e.g., due to shapes and/or sizes of the interfering bodies), such multi-body array may be similar to or the same as any of the multi-body arrays described above. In other words, modifying one or more of the interfering or intersecting bodies to eliminate the interference therebetween would permit such multi-body array to be reconfigured between the unfolded and folded configurations.

Hence, in one or more embodiments, hinges connecting together the bodies of the multi-body array may lie in different planes (e.g., when the multi-body array in a partially folded/unfolded configuration). As noted above, however, for example, modifying the bodies in a manner that would eliminate or reduce interference therebetween, such as to permit folding/unfolding of the multi-body array between fully folded and fully unfolded configurations may also permit positioning the hinges in the hinge planes (which may coincide in the folded and in the unfolded configurations). Furthermore, as described above, the bodies may include or comprise any suitable material, which may be flexible, resilient, compliant, etc. More specifically, for instance, one or more of the bodies may include sufficiently flexible and/or compliant material that bends or deforms (e.g., elastically deform) in manner that may accommodate interference or intersection between two or more bodies during folding/unfolding of the multi-body array. For instance, one or more of the interfering or intersecting bodies may bend and/or deform in a manner that permits the multi-body array to be reconfigured between fully folded and fully unfolded configurations (e.g., in the folded configuration, one or more bodies may be bent or deformed due to interference with one or more other bodies).

Additionally or alternatively, the hinges may be flexible or compliant and/or may have or permit lateral movement. For example, the hinges may bend or otherwise deform (e.g., elastically deform) to permit the interfering bodies to move or pivot past one another, thereby permitting the multi-body array to be reconfigured between the fully folded and/or unfolded configurations. In any event, it should be appreciated that the interfering portions of the interfering or intersecting bodies of the multi-body array may deform and/or move past one another, such as to allow the multi-body array to be reconfigured into the folded and/or unfolded configurations.

While some features of embodiments are described in absolute terms (e.g., planarity, orientation (such as parallel, coincident, etc.), location, colocation (such as all or some elements being located at the same location), etc., it should be appreciated that absolute terms are used only for ease of description. In particular, one having ordinary skill in the art should appreciate that dimensions, orientation(s), location(s), etc., of various features of the embodiments provided in this disclosure may deviate from absolute precision (e.g., depending on manufacturing techniques, practical tolerance, materials used, etc.), and such deviations are within the scope of this disclosure.

While various aspects and embodiments have been disclosed herein, other aspects and embodiments are contemplated. The various aspects and embodiments disclosed herein are for purposes of illustration and are not intended to be limiting.

What is claimed is:

1. A foldable multi-body array reconfigurable between folded and unfolded configurations, the foldable multi-body array comprising:
   a plurality of hinges, each of the plurality of hinges having a pivot axis;
   a plurality of three-dimensional bodies connected together by the plurality of hinges, each of the plurality of three-dimensional bodies is associated with at least one of the plurality of hinges and pivotable about at least one of the pivot axes of the at least one of the plurality of hinges between the unfolded and folded configurations, each of the plurality of three-dimensional bodies includes an electronic functional component;
   in the unfolded configuration, each of the pivot axes of each of the plurality of hinges substantially lies in a first plane; and
   in the folded configuration, each of the pivot axes of each of the plurality of hinges substantially lies in a second plane; and
   wherein at least two of the pivot axes of at least two hinges of the plurality of hinges are oriented at a non-parallel angle relative to one another.

2. The foldable multi-body array of claim 1 wherein the first plane is coincidental with the second plane.

3. The foldable multi-body array of claim 1 wherein at least two pivot axes of at least two hinges of the plurality of hinges are oriented substantially parallel relative to one another.

4. The foldable multi-body array of claim 1 wherein at least one of the plurality of three-dimensional bodies includes a surface that substantially lies in one or more of the first plane or the second plane.

5. The foldable multi-body array of claim 1 wherein at least one of the plurality of three-dimensional bodies includes two or more of the plurality of hinges oriented at a non-parallel angle relative to each other.

6. The foldable multi-body array of claim 1 wherein at least one of the plurality of three-dimensional bodies includes a protrusion extending from the at least one of the plurality of three-dimensional bodies toward the first plane.

7. The foldable multi-body array of claim 6 wherein at least one hinge of the plurality of hinges is connected to the protrusion.

8. The foldable multi-body array of claim 7 wherein at least one of the plurality of three-dimensional bodies includes an opening, and at least a portion of the hinge is positioned in the opening when the foldable multi-body array is in the folded configuration.

9. The foldable multi-body array of claim 1 wherein the plurality of hinges interdependently connect the plurality of three-dimensional bodies such that pivoting of two of the plurality of three-dimensional bodies produces relative pivoting of at least some others of the plurality of three-dimensional bodies.

10. The foldable multi-body array of claim 1 wherein the electronic functional component of each of the plurality of three-dimensional bodies includes a display, a solar panel, a radar emitter, an antenna, or a circuit board.

11. The foldable multi-body array of claim 1 wherein at least some of the plurality of hinges are flexible hinges.

12. A foldable multi-body array reconfigurable between folded and unfolded configurations, the foldable multi-body array comprising:
   a plurality of three-dimensional bodies each of which includes a first surface, at least a portion of each of the first surfaces being substantially planar, each of the plurality of three-dimensional bodies includes an electronic functional component;
   a plurality of protrusions attached to at least some of the three-dimensional bodies, each of the plurality of protrusions extending away from at least one of the first surfaces;
   a plurality of hinges pivotably connecting together the plurality of three-dimensional bodies in a manner that pivoting of the three-dimensional bodies reconfigures the foldable multi-body array between the folded and unfolded configurations, each of the plurality of hinges having a pivot axis;
   when the foldable multi-body array is in the folded configuration, the pivot axes of at least some of the plurality of hinges substantially lie in a first plane that is substantially parallel with the at least one first surface of at least one of the plurality of three-dimensional bodies, and at least one of the pivot axes of at least some of the plurality of hinges is offset from at least one of the first surfaces;

wherein at least two pivot axes of at least two hinges of the plurality of hinges are oriented at a non-parallel angle relative to one another; and wherein each of the pivot axes of each of the plurality of hinges substantially lies in a second plane when the foldable multi-body array is in the unfolded configuration.

13. The foldable multi-body array of claim 11 wherein the first plane is substantially parallel to the second plane.

14. The foldable multi-body array of claim 12 wherein each of the first surfaces is substantially parallel to the first plane when the foldable multi-body array is in the unfolded configuration.

15. The foldable multi-body array of claim 14 wherein each of the first surfaces is substantially parallel to the first plane when the foldable multi-body array is in the folded configuration.

16. The foldable multi-body array of claim 15 wherein at least some of the plurality of three-dimensional bodies are positioned in contact with at least some others of the plurality of three-dimensional bodies when the foldable multi-body array is in the folded configuration.

17. The foldable multi-body array of claim 12 wherein at least some of the plurality of hinges are connected to at least some of the plurality of protrusions.

18. The foldable multi-body array of claim 12 wherein the plurality of hinges interdependently connect the plurality of three-dimensional bodies such that pivoting of two of the plurality of three-dimensional bodies produces relative pivoting of at least some others of the plurality of three-dimensional bodies.

19. The foldable multi-body array of claim 12 wherein two or more three-dimensional bodies interfere with one another as the multi-body array is reconfigured between the folded and unfolded configurations.

20. The foldable multi-body array of claim 12 wherein the electronic functional component of each of the plurality of three-dimensional bodies includes a display, a solar panel, a radar emitter, an antenna, or a circuit board.

21. A foldable multi-body array reconfigurable between folded and unfolded configurations, the foldable multi-body array comprising:

a plurality of three-dimensional bodies each including a plurality of surfaces, each of the plurality of three-dimensional bodies includes an electronic functional component;

a plurality of hinges pivotably connecting together the plurality of three-dimensional bodies in a manner that pivoting of the three-dimensional bodies reconfigures the foldable multi-body array between the folded and unfolded configurations, each of the plurality of hinges has a corresponding pivot axis;

when the foldable multi-body array is in the unfolded configuration, each of the pivot axes of each of the plurality of hinges substantially lies in a first plane, at least one of the plurality of surfaces of each of the three-dimensional bodies is offset from the first plane, and the first plane and the plurality of the three-dimensional bodies are non-intersecting with each other;

when the foldable multi-body array is in the folded configuration, each of the pivot axes of each of the plurality of hinges substantially lies in a second plane; and wherein at least two of the pivot axes of at least two hinges of the plurality of hinges are oriented at a non-parallel angle relative to one another.

22. The foldable multi-body array of claim 21 wherein each of the pivot axes of each of the plurality of hinges substantially lies in the first plane when the foldable multi-body array is in the folded configuration.

23. The foldable multi-body array of claim 21 wherein the first plane and the plurality of the three-dimensional bodies are non-intersecting with each other when the foldable multi-body array is in the folded configuration.

24. The foldable multi-body array of claim 21 wherein at least one of the plurality of surfaces of at least one of the plurality of three-dimensional bodies is substantially planar.

25. The foldable multi-body array of claim 24 wherein the at least one of the plurality of surfaces is substantially parallel with the first plane.

26. The foldable multi-body array of claim 21 wherein two or more three-dimensional bodies interfere with one another as the multi-body array is reconfigured between the folded and unfolded configurations.

27. The foldable multi-body array of claim 21 wherein the electronic functional component of each of the plurality of three-dimensional bodies includes a display, a solar panel, a radar emitter, an antenna, or a circuit board.

* * * * *